United States Patent [19]

Taylor

[11] 4,086,446
[45] Apr. 25, 1978

[54] EMERGENCY ANNOUNCEMENT SYSTEM

[75] Inventor: Robert Marvin Taylor, Middletown, N.J.

[73] Assignee: Bell Telephone Laboratories, Incorporated, Murray Hill, N.J.

[21] Appl. No.: 767,685

[22] Filed: Feb. 11, 1977

[51] Int. Cl.² ............................................ H04M 3/08
[52] U.S. Cl. ............................ 179/27 G; 179/175.3 S
[58] Field of Search .......... 179/175, 175.3 R, 175.3 S, 179/27 G

*Primary Examiner*—William C. Cooper
*Attorney, Agent, or Firm*—James W. Falk

[57] ABSTRACT

A system is disclosed for providing emergency announcements to telephone subscribers when a group of communication paths is out-of-service. More specifically, one operative communication path extending from a base location to a remote location is connected at the remote location to a plurality of out-of-service or dead communication paths also extending from the base location to the remote location. Emergency announcements are transmitted from the base to remote locations over the selected one good path and applied to the plurality of dead paths. Subscribers are then connected at the remote location to the so-called dead paths to hear emergency announcements.

7 Claims, 1 Drawing Figure

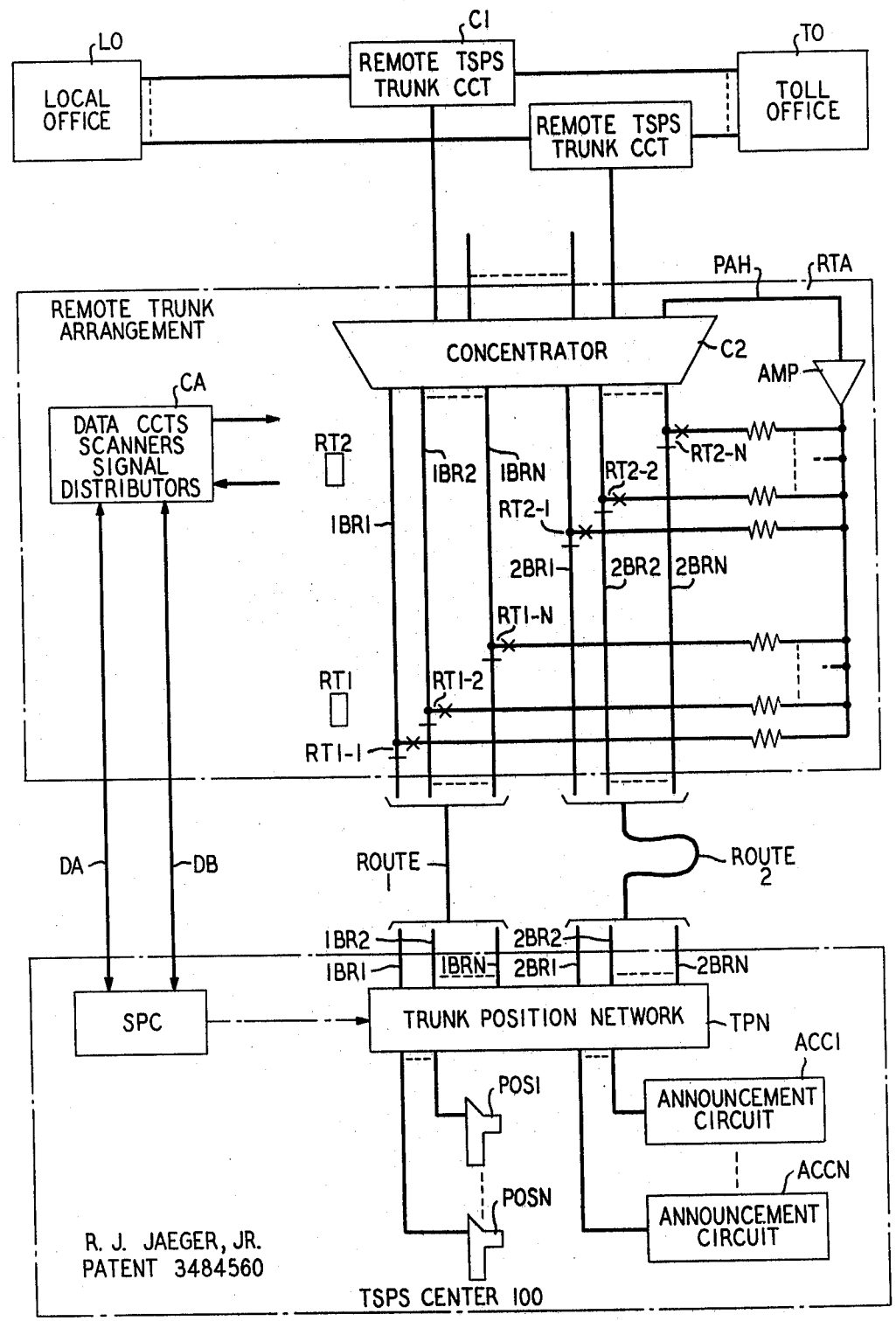

EMERGENCY ANNOUNCEMENT SYSTEM

FIELD OF THE INVENTION

This invention relates to telecommunication systems and, more specifically, to systems for providing emergency announcements when numerous communication paths between two locations are taken out-of-service.

BACKGROUND OF THE INVENTION AND PRIOR ART

During the past twenty years, very significant steps have been taken in the telecommunication field to more efficiently provide operator services. To a large extent this has been accomplished by the development of equipment which automates many routine operator functions.

One such prior art system is called the Traffic Service Position System No. 1 (TSPS No. 1). In TSPS, operators sit at highly sophisticated consoles and depress buttons to complete the various operator functions. The operator call traffic at many local offices can be routed to a single TSPS and served by centralized groups of operators. Thus, unlike operators who operate cordboards associated with particular local offices, TSPS operators are not associated with particular telephone offices. TSPS is extensively described in R. J. Jaeger, Jr. et al., U.S. Pat. 3,484,560, issued Dec. 16, 1969, and also in volume 49 of the Bell System Technical Journal, dated December 1970.

In an improvement is TSPS as taught by A. E. Joel, Jr., U.S. Pat. No. 3,731,000, issued May 1, 1973, groups of TSPS trunk circuits could be located at substantial distances from the main or base station. Accordingly, it was now feasible to serve small isolated toll centers which were not large enough to support an entire TSPS complex by themselves. A concentrator switch was provided at the remote location to connect the remote TSPS trunk circuits to the base TSPS so that the number of voice paths to the base TSPS could be reduced.

In another improvement on TSPS, distinct data links were provided between the base TSPS and the remote location called the remote trunk arrangement (RTA) to facilitate the communication of control information as opposed to voice signals between the base TSPS and RTA. Such an improvement is disclosed by J. A. Hackett in his U.S. Pat. No. 3,958,111, issued May 18, 1976.

Thus, in recent years, operator's services have become more and more centralized with operators serving calls instituted from locations geographically separated by hundreds of miles from the operator positions. This has greatly facilitated the provision of operator services by making it much easier to staff these locations throughout the day and also by making it economically feasible to provide the expensive automated equipment which increases the efficiency of the operator, and at the same time makes his or her job more meaningful. However, since the operators are now separated geographically from the customers they serve, the provision of operator services is more susceptible to failures of the communication equipment and paths which connect the operators to their customers.

More particularly, in the remote trunk arrangement, two distinct and separately routed trunk groups are provided between the RTA and base TSPS. Occasionally, one entire trunk group can be rendered inoperative by equipment failures such as the accidental severance of cables. When this occurs, calling subscribers are connected to operators via the other operative trunk group and service is only marginally degraded. However, when the accident also cuts off outgoing traffic from an associated toll office, calling subscribers are unable to complete a substantial proportion of their direct dialed calls. These subscribers then dial the operator to ascertain why their calls are not being completed. This very quickly overloads the operator capabilities during this emergency and the overload tends to continuously increase as more and more dissatisfied customers seek the assistance of operators. Thus, it becomes imperative under such conditions to inform the calling subscribers of the nature of the difficulty and to further inform them that they should hang up unless their call is of a truly emergency nature.

It is an object of my invention to efficiently provide announcements to calling subscribers served at a remote location during emergency conditions.

SUMMARY OF THE INVENTION

In accordance with one illustrative embodiment of my invention, emergency announcements are provided at the remote location to calling subscribers by utilizing the communication paths which have been rendered "inoperative" by the service outage. To elaborate, one operative communication path between the base TSPS and remote trunk arrangements is utilized to convey the emergency announcement to the remote location. At the RTA, this one "announcement" path is connected to each of the "inoperative" paths. Calling subscribers are then connected at the remote location to these so-called inoperative paths to hear the emergency announcements.

Thus, in accordance with a feature of my invention, during an emergency, one operative path is connected at the remote location to each of the paths rendered inoperative by the emergency. Calling subscribers are then connected to these inoperative paths to hear emergency announcements. Thus, the other operative paths extending between the remote and base locations can be utilized to service the calls of a truly emergency nature.

BRIEF DESCRIPTION OF THE DRAWING

The foregoing as well as other objects, features and advantages of my invention will be more apparent from the following description in conjunction with the drawing, the single FIGURE of which depicts one illustrative embodiment of my invention as incorporated in the remote trunk arrangement in TSPS.

GENERAL DESCRIPTION

As mentioned previously, the single FIGURE illustrates one illustrative embodiment of my invention as incorporated in the remote trunk arrangement (RTA) described in the above-mentioned Hackett patent. The Hackett patent describes in general terms the manner in which the RTA provides operator services; however, to briefly elaborate, calls instituted at telephones served by local office LO are connected to a remote TSPS trunk circuit such as C1. The call is then extended from circuit C1 through concentrator C2 to one of the base remote trunks 1BR1-1BRN or 2BR1-2BRN. Trunks 1BR- are connected to trunk position network TPN via route 1, which is normally a carrier system. Trunks 2BR- are connected to network TPN via geographically distinct route 2, which also may be a carrier system. Concentrator C2 may be hundreds of miles from network TPN and routes 1 and 2 often extend through different cities. For example, with reference to L. Caron, U.S. Pat. No. 3,927,392, issued Dec. 16, 1975, route 1 may extend directly from Syracuse, New York to Watertown, New York, while route 2 may be connected to these cities via Albany, New York and Utica, New York. This is done so that equipment failures associated with one route will not affect the operability of the other route. Normally, the only type of failure which renders inoperative all the trunks in a trunk group is cable severance. This often occurs when construction equipment inadvertently severs buried telephone cables.

Calling subscribers are normally connected to operators at service positions POS1-POSN for example. Thus, network TPN is controlled to selectively connect an operator position to a base remote trunk such as, 1BR1. After the operator receives the number of the called party or receives tones indicating the deposit of coins, the call is outpulsed to toll office TO in the usual manner. When the services of an operator are no longer required, the call is directly cut through from the local office to the toll office via one of the remote TSPS trunk circuits such as C1.

The main control function in TSPS is performed by stored program control SPC which comprises duplicated data processing units for performing arithmetic and logical operation in accordance with its stored program. The SPC also controls the functions in the remote trunk arrangement. This is accomplished by the bilateral communication of data over data links DA and DB between the SPC and circuits CA. Circuits CA comprise well-known modems, signal distributors and scanners. Thus, circuits CA operate as the remote hands and eyes of the SPC. The communication of information over these data links is described in detail in the above-mentioned Caron patent. One suitable scanner is described in D. J. Sassa U.S. Pat. No. 3,894,191, issued July 8, 1975.

The operation of the TSPS and RTA have been described herein only to the extent necessary to fully comprehend the operation of this one illustrative embodiment of my invention. For further details concerning these systems, the above-mentioned patents and publications can be consulted.

During normal operating conditions, calls served at the RTA are routed to operator positions over the base remote trunks 1BR- and 2BR- over routes 1 and 2, respectively. However, during an emergency such as, a hurricane or a construction accident, a substantial portion of the outgoing capacity of the toll office TO may be rendered inoperative. Thus, large numbers of direct dialed calls will not be completed. Many of these callers upon being unable to complete the calls themselves will seek the assistance of an operator. Thus, the number of operator calls which will have to be connected to one of the positions POS1-POSN will increase substantially. These calls will be handled in a routine manner using the trunks traversing both routes 1 and 2. However, often either route 1 or route 2 will parallel outgoing trunks from toll office TO; thus the service outage at toll office TO may also completely disrupt the trunk circuits in one of these routes. Assuming this does occur, an increasingly large load of operator traffic will be routed over a single route (i.e., either route 1 or route 2) to the base TSPS. Under these conditions, it is anticipated that there will be insufficient capacity to service all these operator calls. Thus, it is imperative to inform calling subscribers of the nature of the emergency and to request that they not make any long distance calls or operator assistance calls except for truly emergency calls.

In accordance with the principles of this invention, one of the operative base remote trunks is connected by network TPN to an announcement circuit such as ACC1 under the control of the SPC. This announcement circuit can be a well-known continuously repeating tape recorder. To facilitate the understanding of this one illustrative embodiment, we shall assume that route 1 has been severed and trunks 1BR1-1BRN cannot communicate voice signals between the base and remote locations. Such a condition is immediately detected by the SPC in a well-known manner, illustratively, when the loss of a tone continuity between the base and remote locations is detected. To elaborate, when a base remote trunk is idle, a tone is continuously transmitted from the remote location to the base location and back to the remote location where the tone is detected. The loss of such a tone would be detected by circuits CA at the remote location and a notification thereof would be transmitted to the SPC.

We shall further assume that base remote trunk 2BRN is selected as the "announcement" trunk and is connected to circuit ACC1. Then the SPC transmits a command to circuits CA and more particularly to the signal distributor to operate relay RT1. This causes the operation of each of the pairs of contacts RT1-1 through RT1-N which respectively connect the so-called out-of-service trunks 1BR1 through 1BRN to the output of amplifier AMP via the various resistors. Then the SPC controls concentrator C2 in the usual manner to connect base remote trunk 2BRN to path PAH which extends to amplifer AMP. Thus, the emergency announcement transmitted by announcement circuit ACC1 at the base location is conveyed through network TPN to trunk 2BRN and through concentrator C2 at the remote location to path PAH. Amplifier AMP then amplifies the voice announcement and applies it through operated contacts RT1- to each of the trunk circuits in route 1 namely 1BR1-1BRN. Now operator assistance calls received from local office LO via the remote TSPS trunk circuits such as C1, are connected by concentrator C2 under the control of the SPC to one of the trunks 1BR1-1BRN to hear the emergency announcement when each of the other operative trunks 2BR1-2BRN is busy.

The output of amplifier AMP is similarly connectible to each of the trunks in route 2. Thus, if the trunks in route 2 failed and the trunks in route 1 were still operative, then relay RT2 would have been operated so that the emergency announcement conveyed over one of the trunks 1BR1 through 1BRN could have been applied to each of the inoperative trunks 2BR1 through 2BRN.

Thus, in accordance with the principles of my invention, emergency announcements can be conveyed to a calling subscriber at a remote location by essentially connecting one in-service communication path at the remote location to a plurality of out-of-service communication paths and then connecting the calling subscribers to these "out-of-service" communication paths at the remote location.

Although the invention and numerous features thereof have been described in connection with a particular embodiment it is to be understood that additional applications and embodiments which will be obvious to those skilled in the art are included within the spirit and scope of the invention.

What is claimed is:

1. In combination, base and remote locations interconnected by first and second groups of trunks, means at the remote location for connecting one trunk in said first group concurrently to each of a plurality of trunks in said second group, and means at the base location for applying an announcement to said one trunk in said first group.

2. An announcement system comprising:

first and second groups of communication paths interconnecting a base location and a remote location, switch means at said remote location for connecting ones of a third group of communication paths to ones of said first or second groups of communication paths, means at the base location for connecting a source of announcements to one communication path in said first group of communication paths, and means at said remote location including said switch means for connecting said one communication path to a plurality of communication paths in said second group, thereby allowing the provision of announcements to the third group of communication paths utilizing said one communication path in said first group and said plurality of communication paths in said second group.

3. In combination, first and second groups of communication paths interconnecting a base location and a remote location over distinct first and second routes, respectively, base switch means at said base location normally operative for connecting a source of announcements to ones of said first route group or second route group of communication paths, remote switch means at said remote location operative for connecting said ones of said first route group or second route group of communication paths to ones of a third group of communication paths extending to subscriber stations to provide announcements thereto, means responsive to the detection of the inability to communicate between said locations over a plurality of communication paths in said second route group for controlling said base switch means to connect said announcement source to one of the communication paths in said first route group, coupling means including said remote switch means and responsive to said last-named control means for connecting said one communication path in said first route group to said plurality of communication paths in said second route group, and said control means also controlling said remote switch means to connect ones of said communication paths in said third group to ones of said last-named plurality of communication paths in said second route group to thereby receive announcements provided via said one path in said first route group.

4. An emergency announcement system comprising:

a plurality of subscriber communication paths at one location, a source of announcements at another location, first and second independent groups of communication paths extending between said locations, first switch means controllable for connecting ones of said subscriber communication paths to ones of said first or second groups of communication paths, second switch means controllable for connecting ones of said first or second groups of communication paths to said announcement source, a loop back path having one end terminated on said first switch means and the other end switch connectable to a plurality of said communication paths in said second group, first control means operable upon the inability to communicate between said locations over said second group of communication paths for controlling said second switch means to connect said announcement source to one of said communication paths of said first group, means controlled by said first control means for establishing a switched connection between said loop back path and said plurality of said communication paths in said second group, and second control means controlled by said first control means for controlling said first switch means to connect said one communication path of said first group to said loop back path and for controlling said first switch means to connect ones of said subscriber communication paths to ones of said plurality of communication paths of said second group, whereby announcements are conveyed to said ones of said subscriber communication paths from said announcement source via said second switch means, said one communication path of said first group, said first switch means, said loop back path, said means for establishing, said ones of said plurality of communication paths in said second group and again said first switch means.

5. In combination, a plurality of communicaton paths operative for conveying signals between a base location and a remote location, a plurality of communication paths inoperative for conveying signals between the base location and the remote location, means at the remote location for connecting one of the operative communication paths to a plurality of the inoperative communication paths, means at the base location for applying an announcement to said one operative communication path, and means at the remote location for connecting other calling communication paths to ones of said plurality of inoperative communication paths thereby allowing said announcement to be conveyed to these other calling communication paths via said one operative communication path and said plurality of inoperative communication paths.

6. In combination, a plurality of groups of communication paths interconnecting first and second locations, a source of announcements at said first location, first means at said first location for connecting said source of announcements to one communication path in one of said groups, and second means at said second location for connecting said one communication path to all of said communication paths in a group other than said one group.

7. In combination in a remote trunk arrangement for a traffic service position system, a plurality of groups of trunks interconnecting a remote trunk arrangement and a traffic service position system, a source of announcements at said position system, means at said position system responsive to the detection of the inability to communicate over the trunks in one of said groups for connecting said announcement source to one trunk of a group other than said one group, and means at said remote trunk arrangement also responsive to said detection for connecting said one trunk to all of said trunks of said one group.

* * * * *